July 31, 1962 J. J. BLACK 3,046,910
LANDING GEAR CLAMPING DEVICE
Filed Sept. 4, 1956 2 Sheets-Sheet 1
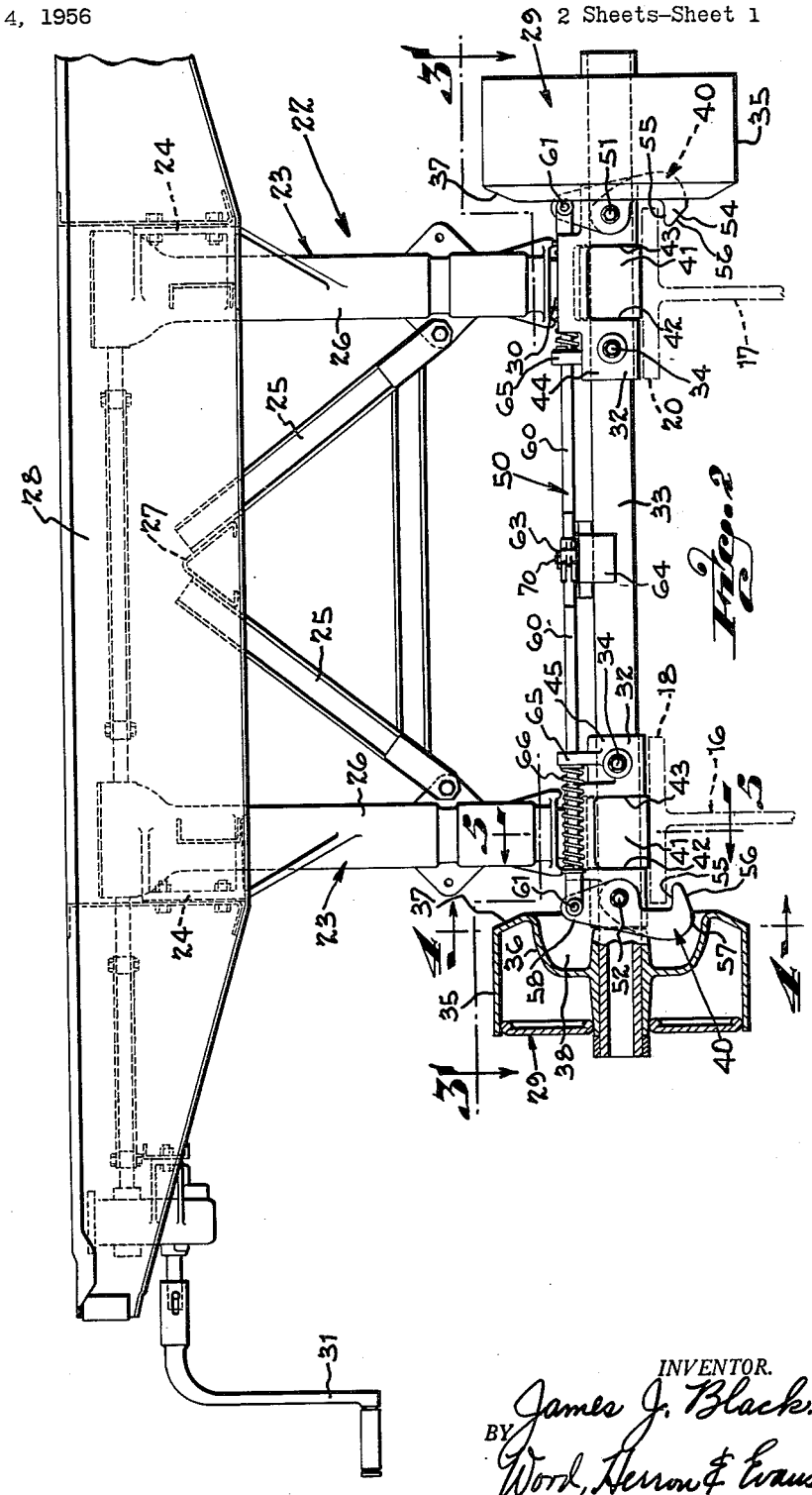
INVENTOR.
James J. Black.
BY
Wood, Herron & Evans.
ATTORNEYS.

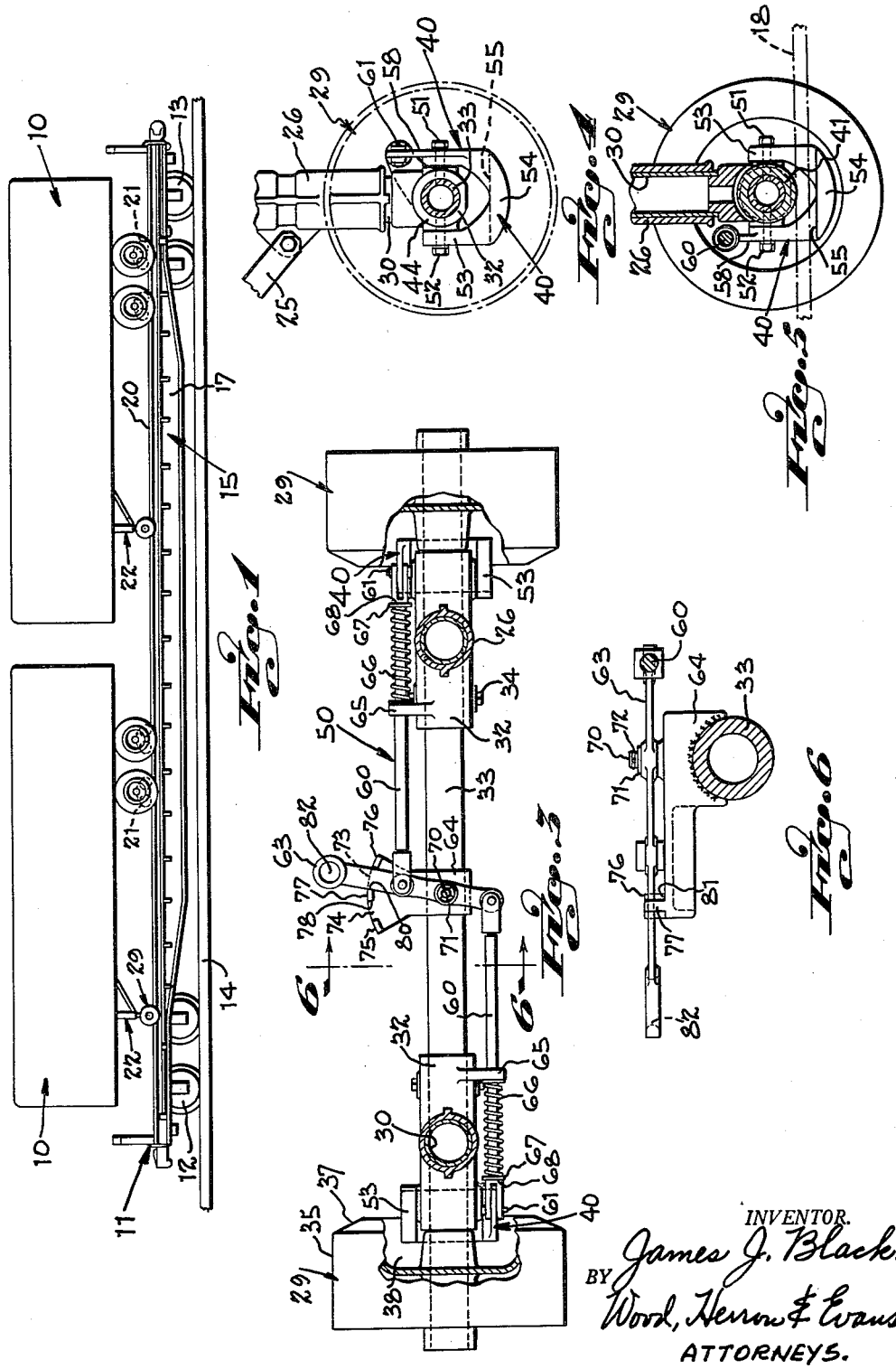

United States Patent Office 3,046,910
Patented July 31, 1962

3,046,910
LANDING GEAR CLAMPING DEVICE
James J. Black, Cincinnati, Ohio, assignor to Trailmobile, Inc., Cincinnati, Ohio, a corporation of Delaware
Filed Sept. 4, 1956, Ser. No. 607,941
9 Claims. (Cl. 105—368)

This invention relates to semi-trailers and is particularly directed to a landing gear, or prop, construction adapted to facilitate the use of such trailers with piggyback railroad cars.

In recent years, it has become increasingly common practice to ship loaded semi-trailer bodies on railway cars. The trailers are first loaded at a factory or warehouse and are then hauled by motor truck, or tractor to the railroad yard where they are loaded on a railroad car and uncoupled from the tractor. The trailer is transported on the railroad car to a point near its destination and is then coupled to another truck or tractor and hauled to an unloading point. In this way major economies are effected since the advantages of a truck over short hauls are coupled with the advantages of a train on long hauls.

One major disadvantage of such a system is the time heretofore required to load and secure a trailer on a car. In the past, it has required a crew of from four to six men six minutes to load and secure a trailer. This time is largely consumed in adjusting the cumbersome chains and jacks used to tie the trailer down. It will readily be appreciated that the excessive operating costs involved in loading and unloading the trailers greatly decreases the cost advantage of the piggyback system.

It is the principal object of the present invention to greatly simplify the loading and securing of a trailer on a railroad car by providing a novel landing gear assembly including a latching mechanism mounted directly on the landing gear and adapted to secure the forward end of the trailer in position on a railroad car without the need for chains, jacks or the like. While the present latching mechanism is particularly adapted for use in connection with special railway car developed by Piggy-Back Inc., it is contemplated that it can also be used with other suitable cars having longitudinal center rails.

While the details of construction of the Piggy-Back car do not form part of the present invention, the car will be briefly described to illustrate one suitable type of car with which the present latching mechanism can be employed. One form of car which has been developed by Piggy-Back Inc. includes, in addition to conventional wheel trucks, coupling devices and the like, two longitudinally disposed I beams which are horizontally spaced from one another and extend substantially the full length of the car. Each of these I beams includes an upper horizontal flange, the upper flanges in combination, forming a pair of spaced rails. The railway car is also fitted with suitable clamping lugs adapted to engage dollies mounted beneath the rear axle of a semi-trailer. These dollies rotatably support flanged wheels adapted to track upon the longitudinal car rails to support the weight of the rear end of the trailer and to center it transversely of the car.

The present invention is directed to a landing gear, or prop, construction including members adapted to cooperate with the rails for supporting and latching the forward end of the trailer. As will readily be appreciated by those skilled in the art, semi-trailers are conventionally provided with a landing gear including substantially vertical legs and small wheels rotatably journaled at the lower ends of the legs. Such a landing gear normally functions to support the weight of the forward end of the trailer when the trailer is unhitched from a tractor, as for example, when the trailer is being loaded or unloaded.

It is the concept of the present invention to provide a landing gear construction which is adapted to perform this normal function of supporting the forward end of the trailer when it is detached from the tractor in conventional use; and which is also effective to support the forward end of the trailer upon the rails of a piggyback car and to engage the rails so as to prevent transverse sliding or tipping movement of the trailer relative to the rails.

A preferred embodiment of landing gear constructed in accordance with the present invention comprises two substantially vertical legs, and a transverse axle mounted at the lower end of the legs and rotatably supporting two load carrying rollers disposed beneath the legs. The axle also carries two landing gear wheels mounted at the ends of the axle and spaced outwardly of the load rollers. The landing gear wheels are adapted to engage the ground and support the trailer when it is not attached to a tractor. These wheels are also adapted to straddle the rails of a piggyback car, and thereby center the front end of the trailer while the weight of the trailer is supported on the rotatable load bearing rollers which track upon the top of the rails.

The inner face of each of the landing gear wheels is recessed to form a deep well adapted to house a clamping member of the latching mechanism which is formed integral with the landing gear. This latching mechanism comprises a pair of clamping, or latching, members pivotally secured to the axle adjacent to the inner edges of the landing gear wheels. Each of the latching members include an inwardly extending lip adapted to engage the under surface of the rail flange when the latching members are pivoted to their inner, or latched position. When so positioned, the latching members are effective to prevent the trailer from being tipped or over turned when the railway car goes around a curve or is heavily jarred.

An actuating mechanism is provided for advancing and retracting the latching members, the latching members in their retracted position being substantially housed within the wheel recesses. In the preferred embodiment, this actuating mechanism includes two actuating rods, each rod being attached at one end to one of the latching members and at the other end to an actuating bar pivotally secured to the central portion of the axle. The rods are secured to the actuating bar in such a manner that when the bar is pivoted, the rods are simultaneously retracted or advanced along the axle to pivot the latching members. The pivotal latching bar cooperates with a stationary plate having two spaced slots formed therein, one of the slots holding the bar so that the clamping members are in an unlatched position, the other slot holding the bar so that these members are in a latched position. To shift the bar from one slot to another, a workman standing along side the railway car employs an elongated off-set handle which is inserted in an aperture provided in the latching bar.

One of the principal advantages of the present latching mechanism is that it is formed as a part of the trailer landing gear and eliminates the need for cumbersome chains and jacks. The latching mechanism can be operated by a single workman as contrasted to the four to six as previously required. Moreover, by employing the present latching mechanism in conjunction with the dolly construction, briefly described above, a trailer can be mounted and secured in place on a railway car in one minute, or in about one sixth of the time previously required.

A further advantage of the present landing gear construction is that it does not interfere with the normal use of the landing gear. In their unlatched position, the clamping members are substantially housed within the wheel recesses where they do not interfere with the use of the landing gear wheels or with the raising and lowering of these wheels. Furthermore, the landing gear wheels protect these latching members from contact with mud, rocks and the like which are frequently thrown upwardly by the tractor wheels.

A further advantage of the present construction is that the landing gear wheels aid in loading the trailer on a piggyback car since these wheels are positioned to engage the sides of the car rails and function to center the trailer relative to the rails before the latching mechanism is actuated.

An additional advantage of the present invention is that a minimum strain is imposed on the landing gear when the trailer is mounted upon a railroad car. More particularly, the load rollers are mounted directly beneath the landing gear legs; and the latching members engage the rails in a transverse line with the legs so that no torque or twisting moment is imposed upon the landing gear.

A still further advantage of the present landing gear construction is that it facilitates longitudinal movement of the trailer relative to the rails. As explained below, the rear axle clamping mechanism provided on the piggyback railroad car incorporates a shock absorber which permits the trailer to be moved several inches along the rails in the event of a sharp impact. This greatly lessens the force transmitted to the trailer and its lading. In the present latching mechanism, the clamping members in their latched position are preferably spaced slightly from the rails, so as not to interfere with longitudinal movement of the trailer which is facilitated by the rotatable load bearing rollers. It will be appreciated, however, that the lips of the clamping members are positioned to engage the under surface of the rails to prevent tipping of the trailer due to centrifugal or impact force.

A still further advantage of the present latching mechanism is that it includes means effective to prevent damage to the mechanism in the event that the trailer is dropped upon the car rails with the members in their latched position. As explained in detail below, these means include camming surfaces formed on the lower edges of the clamping members, the camming surfaces being effective to urge the clamping members outwardly free of the rails in the event that the trailer is dropped onto the rails with the clamping members advanced inwardly.

These and other objects and advantages of the present invention will be more readily apparent from a consideration of the following detailed description of the drawings illustrating a preferred embodiment of the invention.

In the drawings:

FIGURE 1 is a side view of a railroad car loaded with two semi-trailers embodying the latching mechanism of the present invention;

FIGURE 2 is a front view of the landing gear of a trailer, a portion of one landing gear wheel being broken away to illustrate details of construction;

FIGURE 3 is a cross-sectional view taken along line 3—3 of FIGURE 2, a portion of the landing gear wheels being broken away;

FIGURE 4 is a cross-sectional view taken along line 4—4 of FIGURE 2;

FIGURE 5 is a cross-sectional view taken along line 5—5 of FIGURE 2 and

FIGURE 6 is a cross-sectional view taken along line 6—6 of FIGURE 3.

FIGURE 1 shows the manner in which truck trailers 10 constructed in accordance with the present invention are adapted to be transported on a railroad car 11. Car 11 is one especially designed for piggyback service and was developed by Piggy-Back Inc. While the present trailer is particularly adapted for use in conjunction with this type of car; the details of the car construction constitute no part of the present invention, and it is contemplated that the present landing gear construction can be employed with a railroad car of a generally similar design but differing in various details from the car developed by Piggy-Back Inc.

However, in order to provide a fuller understanding of the present invention, one form of piggyback car 11 will be described briefly. As shown in FIGURE 1, railroad car 11 includes two spaced sets of trucks 12 and 13 adapted to track on rails 14. The trucks are interconnected by means of a deep center sill 15 formed by I beams 16 and 17. The I beams are interconnected by suitable cross-members and are disposed so that their top flanges 18 and 20 extend in parallel spaced relationship to one another longitudinally of the car. The car is also provided with suitable catwalks, conventional safety appliances, and end bridge rails which are of no concern to the present invention.

Piggyback car 11 is adapted to carry two truck trailers as shown in FIGURE 1. The trailers have a conventional chassis but are fitted with special loading dollies attached to the rear axle of the trailer. Each of the dollies included flanged wheels 21 adapted to track on one of the flanges 18 and 20 of I beams 16 and 17. These dolly wheels both support and guide the rear end of the trailer. The trailer tires straddle the center sill and depend freely several inches below flanges 18 and 20, thereby lowering the vertical clearance required for the car and trailer. The piggyback car is also provided with special tie down devices including pivoted lugs which fit into recesses provided in the dolly assemblies to lock the rear end of the trailer in place. These tie down devices include a rubber shock absorber effective to permit the trailer to move approximately ten inches along the rails under impact; thereby, substantially reducing the shock force transmitted to the trailer and its lading. These rear tie down devices and the cooperating dollies mounted on the rear truck axle constitute no part of the present invention.

The landing gear construction which forms the subject matter of the present invention is best shown in FIGURES 2–6. As there shown, a landing gear, or prop, 22 is mounted beneath the forward end of a trailer body of conventional construction. One function of the landing gear is to support the front end of the semi-trailer when the trailer is positioned for loading and unloading after detachment from the tractor. It is to be understood that the landing gear clamping mechanism of this invention can be incorporated in manually operated landing gear, such as for example, the one shown; and can also be incorporated in landing gear of the type which is automatically lowered and retracted as, for example, the landing gear shown in J. J. Black Patent No. 2,572,240.

The particular landing gear illustrated in the drawings as one suitable form of manually operated landing gear forms the subject matter of J. J. Black, Patent No. 2,499,625. As shown in FIGURE 2, the landing gear 22 comprises two telescopic tubular post assemblies designated at 23, the post assemblies being disposed in a vertical position on the under side of the trailer body. These post assemblies are strong and rigid and are welded or otherwise secured at their upper ends to longitudinal channel members 24 of the truck chassis. Suitable cross braces 25 are bolted or otherwise secured to plates joined to tubular post members 26. The upper ends of the cross braces are welded or secured in some other suitable manner to a longitudinal support member 27, which is in turn, joined to transverse frame members 28. Tubular members 26, telescopically receive inner tubular members or posts 30, the posts 30 being retractable with respect to outer members 26. Posts 30 are positioned by means of a suitable elevator mechanism, such as that shown in Patent No. 2,499,625, the elevator mechanism being actuated by a crank 31 which is turned to selectively raise or lower the landing gear. Inner posts 30 are welded or otherwise secured to journal housing members 32. Each of the housings 32 is provided with a bore for receiving axle 33, the axle being secured in place against transverse movement by welding or by means of suitable bolts 34.

Axle 33 carries adjacent to both of its ends, a landing gear wheel 29. These wheels are fabricated from sheet steel in any suitable manner and are configured to provide a wide circular periphery 35, and an inner face 36 joined to peripheral band 35 by bevelled section 37. The inner face of the wheel is recessed, or dished inwardly, to form a deep well 38 adapted to receive latching members 40 when the latter are pivoted to their unlatched position.

Axle 33 also carries load bearing rollers 41, rotatably mounted on the axle and disposed directly beneath post members 30, the rollers being held in position by shoulders 42 and 43 respectively formed on spaced journal sections 44 and 45 of housing members 32.

When the trailer is used in conjunction with a tractor in a conventional manner, landing gear wheels 29 function to support the trailer when it is unhitched from the tractor. When the trailer is used in conjunction with a piggyback railroad car, wheels 29 straddle rails 18 and 20 and function to guide and align the forward end of the trailer transversely of the rails. When the trailer is mounted on a piggyback car, the weight on the front end of the trailer is carried by load bearing rollers 41 which track upon rails 18 and 20 and are disposed directly beneath posts 30. These rollers also provide means for shifting the trailer longitudinally along the tracks, under the influence of the rubber shock absorbers provided in the rear clamping devices.

Landing gear 22 also carries a latching mechanism 50 for securing the forward end of the trailer relative to rails 18 and 20 to prevent the trailer from shifting laterally or overturning when the railroad car goes around a curve or is jarred in some manner. Latching mechanism 50 comprises two clamping or latching members 40, pivotally mounted on pins 51 which pass through axle 33, the pins being provided with threaded endwise portions adapted to receive nuts 52. As best shown in FIGURES 2 and 5, each of the latching members includes two spaced arms 53 adapted to embrace an outer journal section 43 of a housing 32, the arms being provided with suitable bores for receiving pin 51. The lower end of each latching member 40 is configurated to form a lip 54, the lip having a horizontal upper surface 55 adapted to abut the under surface of flange 18 or 20 when the latching member is in its latched rail engaging position as shown in FIGURE 2. The outer, or lower, surface of lip portion 54 of the latching member is bevelled as at 56, the bevel extending outwardly and downwardly to a point 57 beyond the outer edge of the rail flange.

The upper end of latching member 40 remote from the lip is provided with a flange 58 disposed for engagement with an actuating rod 60 pivotally joined to this flange as by means of a bolt 61. Each of the actuating rods 60 extends parallel to axle 33 inwardly from the flange to an actuating bar 63 pivotally mounted on a plate 64. This plate is in turn welded or otherwise secured to the center portion of the axle. Each of the rods 60 is held in alignment by means of a guide bracket 65 formed adjacent to the inner end of housing 32. Each of the guide rods 60 also carries a coil spring 66 compressed between guide bracket 65 and a washer 67 in abutment with a shoulder 68 formed adjacent to the outer end of the guide rod.

As best shown in FIGURE 6, actuating bar 63 is loosely mounted on a pin 70 which is press fitted or otherwise mounted on plate 64. Actuating bar 63 is mounted for limited vertical movement, axially of the pin, but is prevented from becoming disengaged from the pin by means of washer 71 and a cotter pin 72.

As best shown in FIGURE 3, actuating rods 60 are disposed on opposite sides of pivot pin 71 and are joined to the actuating bar at points equally spaced on opposite sides of this pin. Consequently, when actuating bar 63 is pivoted about the pin, rods 60 are retracted or advanced in unison, parallel to axle 33. Plate 64 is configurated to form two spaced slots 73 and 74 adapted to receive the free end of bar 63. The outer end of each of these slots is defined by vertical lugs 75 and 76 while the slots are divided from one another by a triangular lug 77. Lug 77 has a straight vertical face 78 and a sloping face 80 which slopes downwardly from face 78 to the bottom of slot 81. Bar 63 is shifted from one slot to another by raising the free end of the bar to clear center lug 77 and then pivoting the bar about pin 70. The outer end of the bar is preferably formed with a suitable opening 82 for receiving the end of an elongated off-set handle by means of which a workman standing on the side of the car can readily manipulate the actuating bar.

When the actuating bar is in slot 73, as shown in FIGURES 2 and 3, rods 60 are advanced, or shifted outwardly, to pivot latching members 40 inwardly to their latching position. In this position, lips 54 of the latching members are disposed beneath the rail flanges and are adapted to grip the flanges and prevent the trailer from being tipped or overturned. Preferably, the latching members are spaced slightly from the rails so that the trailer is free to move longitudinally under the influence of the shock absorbers associated with the rear clamping members.

When latching bar 63 is shifted to slot 74, rods 60 are retracted, or drawn inwardly, to pivot clamping members 40 outwardly to an unlatched position in which lips 54 are shifted outwardly beyond the edges of the rails and are recessed in wells 38 of the landing gear wheels.

In the event that the trailer is lowered onto the car rails 18 and 20 with the latching members in their latching position, damage is prevented to these members by the action of camming surfaces 56 of the latching members and angulated surface 80 on center lug 77 of plate 64. For when the trailer is lowered with the latching members 40 in a latched position bevelled portions 56 of the members engages the rail flanges, camming the latches outwardly against the compressive force of springs 66 until the latching members clear the rails. Rods 60 are forced inwardly and in turn force bar 63 upwardly along sloping face 80 of center lug 77 (counterclockwise in FIGURE 3).

In operation, when trailer 10 is used in conjunction with a tractor, latching members 40 are shifted to their unlatched position by shifting bar 63 to slot 74. In their unlatched position, members 40 are protected by the well recesses from contact with mud, stones and other material thrown upwardly by the tractor wheels. The trailer is adapted to be supported by landing gear 22 and wheels 29 in a conventional manner until it is attached to a tractor. Thereafter, landing gear wheels 29 are raised by turning crank 31 to actuate the elevator mechanism. When the trailer reaches its destination, wheels 29 are lowered by rotating crank 31 is its reverse direction so that wheels are positioned to support the trailer when it is disengaged from the tractor.

In order to load the trailer upon a piggyback car 11, the trailer is backed onto the car with dolly wheels 21 tracking along rails 18 and 20. These dolly wheels center and support the rear end of the trailer. As the truck is backed over the rails, landing gear wheels 29 straddle the rails and function to center the front end of the trailer while rollers 41 are positioned to track along the upper surfaces of the rails. After the trailer has been properly positioned relative to the railroad car, the rear clamping device is tripped to engage the dollies and secure the rear end of the trailer in place. When the rear end of the trailer has been clamped in position, a workman lifts bar 63 and shifts it from notch 74 to notch 73 to pivot latching members 40 to their latching position with lips 54 beneath the rail flanges.

The weight of the forward end of the trailer is born by load rollers 41 disposed in vertical alignment with legs 23 and any tilting tendency is resisted by lips 54 engaging the under surface of the rails. Since these lips are in alignment with axle 33 and in transverse alignment with posts 23, no twisting torque is imposed upon the landing gear. Lips 54 are preferably spaced slightly from the rails so that the trailer is free to move longitudinally along the rails on rollers 41 under the influence of the rubber shock absorbers provided in the rear clamping members.

To remove the trailer from the piggyback car, a workman using a long off-set handle shifts actuating bar 63 to slot 74 to retract latching members 40. The workman also disengages the rear clamping members after which a tractor is backed onto the piggyback car, and secured to the trailer which is driven off the piggyback car, down a ramp and onto a highway.

Having described my invention, I claim:

1. A landing gear adapted to support a semi-trailer upon a railroad car having longitudinally extending flanged rails, said landing gear comprising a pair of spaced posts mounted beneath the trailer chassis, an axle carried by said posts and mounted beneath and secured to the ends of said posts, wheels rotatably journaled at the ends of said axle, load rollers rotatably journaled on said axle directly beneath each of said posts, latching members, means pivotally mounting said latching members upon said axle intermediate said landing gear wheels and said load bearing rollers, each of said latching members comprising an inwardly extending lip adapted to engage the under surface of said rail flange, and means for selectively shifting said latching members to a rail engaging position, said means comprising a rod secured to each of the latching members, a bar pivotally secured to the axle at the central portion thereof, means pivotally connecting said rods to said bar on opposite sides of its pivotal connection to the axle.

2. A landing gear adapted to support a semi-trailer upon a railroad car having longitudinally extending flanged rails, said landing gear comprising a pair of spaced posts mounted beneath the trailer chassis, an axle carried by said posts and mounted beneath and secured to the ends of said posts, wheels rotatably journaled at the ends of said axle, load rollers rotatably journaled on said axle directly beneath each of said posts, latching members, means pivotally mounting said latching members upon said axle intermediate said landing gear wheels and said load bearing rollers, each of said latching members comprising an inwardly extending lip adapted to engage the under surface of said rail flange, and means for selectively shifting said latching members to a rail engaging position, said means comprising a rod secured to each of the latching members, a bar pivotally secured to the axle at the central portion thereof, means pivotally connecting said rods to said bar on opposite sides of its pivotal connection to the axle, and a stationary plate having a flange configurated to form two recesses separated by an upstanding lug, said recesses being adapted to receive said bar, said bar being pivotally mounted upon said axle for pivotal movement in a first direction and for limited movement in a second direction, whereby the bar may be lifted over said lug and shifted from one of said recesses to the other of said recesses.

3. A landing gear adapted to support a semi-trailer upon a railroad car having longitudinally extending flanged rails, said landing gear comprising a pair of spaced posts mounted beneath the trailer chassis, an axle carried by said posts and mounted beneath and secured to the ends of said posts, wheels rotatably journaled at the ends of said axle, load rollers rotatably journaled on said axle directly beneath each of said posts intermediate and wheels, latching members, means pivotally mounting said latching members upon said axle intermediate said landing gear wheels and load bearing rollers, each of said latching members comprising an inwardly extending lip adapted to engage the under surface of said rail flange, and means for selectively shifting said latching members to a rail engaging position, said means comprising a rod secured to each of the latching members, a bar pivotally secured to the axle at the central portion thereof, said rods being pivotally connected to said bar on opposite sides of its pivotal connection to the axle, and a stationary plate having a flange configurated to form two recesses separated by an upstanding lug, said recesses being adapted to receive said bar, the pivotal connection of said bar to said axle permitting movement of the bar at an angle to its pivotal movement, whereby the bar may be lifted over said lug and shifted from one of said recesses to the other of said recesses, the outer edge of said latching members having a cam surface adapted to engage said rails and urge said latching members outwardly, one side of said lug being bevelled whereby said bar is shifted when said latching members are forced outwardly.

4. A landing gear for a semi-trailer comprising posts mounted beneath and secured to the chassis of said trailer, an axle secured to the lower end of said posts, landing gear wheels rotatably journalled on said axle adjacent to the ends of said axle, spaced load bearing rollers rotatably journalled on said axle intermediate said wheels, each of said load bearing rollers being disposed closely adjacent to one of said wheels, said load bearing rollers being of smaller diameter than said wheels and being adapted for engagement with spaced rails, said landing gear wheels being effective to straddle said rollers and limit transverse movement of said landing gear relative to said rails, a latching member, means pivotally mounting said latching member upon said landing gear intermediate said landing gear wheels and load bearing rollers, said latching member having means formed thereon for engaging the underside of a rail, and means mounted upon said landing gear and in mechanical interconnection with said latching member for pivoting said latching member to selectively shift it a rail engaging position.

5. A landing gear adapted to support a semi-trailer on a railroad car having longitudinally extending flanged rails, said landing gear comprising posts mounted beneath and secured to the trailer chassis, an axle secured to the lower end of said posts, landing gear wheels rotatably mounted upon said axle adjacent to the ends thereof, said wheels being spaced apart a sufficient distance to straddle said rails, spaced load bearing rollers rotatably mounted upon said axle intermediate said landing gear wheels, each of said load bearing rollers being disposed closely adjacent to one of said landing gear wheels, said load bearing rollers being adapted to track upon said rails, said landing gear wheels depending below said load rollers, whereby said landing gear wheels are effective to limit transverse movement of said landing gear transversely of said rails, a latching member, means pivotally mounting said latching member upon said axle intermediate said landing gear wheel and said load bearing rollers, said latching member including a portion adapted for engagement with the under surface of a rail flange.

6. A landing gear adapted to support a semi-trailer upon a railroad car having longitudinally extending flanged rails, said landing gear comprising a pair of spaced posts mounted beneath and secured to the trailer chassis, an axle carried by said posts and mounted beneath the ends of said posts, wheels rotatably journalled at the ends of said axle, load rollers rotatably journalled on said axle directly beneath each of said posts, latching members, means pivotally mounting said latching members upon said axle intermediate said landing gear wheels and said load bearing rollers, each of said latching members including an inwardly extending lip adapted to engage the under surface of the rail flange, and means mounted upon said landing gear and in mechanical interconnection with said latching members for selectively shifting said latching members to a rail engaging position.

7. A landing gear adapted to support a semi-trailer upon a railroad car having longitudinally extending flanged rails, said landing gear comprising a pair of spaced posts mounted beneath and secured to the trailer chassis, an axle carried by said posts and mounted beneath the ends of said posts, wheels rotatably journalled at the ends of said axle, spaced load rollers rotatably journalled on said axle intermediate said load rollers and directly beneath each of said posts, said load rollers being smaller in diameter than said wheels, latching members, means pivotally mounting said latching members upon said axle intermediate said landing gear wheels and load bearing rollers, each of said latching members comprising an inwardly extending lip adapted to engage the under surface of said rail flange and means mounted upon said landing gear and in mechanical interconnection with said latching members for selectively shifting said latching members to a latching position in which said lip is disposed adjacent to, but spaced from, said rail flange.

8. A landing gear adapted to support a semi-trailer upon a railroad car having longitudinally extending flanged rails, said landing gear comprising a pair of spaced posts mounted beneath and secured to the trailer chassis, an axle carried by said posts and mounted beneath the ends of said posts, wheels rotatably journalled at the ends of said axle, said wheels having recessed inner faces, load rollers rotatably journalled on said axle intermediate said wheels and directly beneath each of said posts, latching members, means pivotally mounting said latching members upon said axle intermediate said landing gear wheels and said load bearing rollers, each of said latching members comprising an inwardly extending lip adapted to engage the under surface of said rail flange, said latching members being pivotally joined to said axle closely adjacent to said wheels and being shiftable to a retracted position in which said members reside within said wheel recesses, and means mounted upon said landing gear and in mechanical interconnection with said latching members for selectively shifting said latching members between a rail engaging position and a retracted position.

9. A landing gear adapted to support a semi-trailer on a railroad car having longitudinally extending flanged rails, said landing gear comprising posts mounted beneath and secured to the chassis of said trailer, spaced landing gear wheels, means carried by said posts for rotatably mounting said wheels adjacent to the lower ends of said posts, said landing gear wheels including an inner surface adapted to engage the side of said rail flanges for limiting transverse movement of said trailer relative to said rails, load rollers of a smaller diameter than said wheels, means carried by said posts for mounting said load rollers intermediate said landing gear wheels adjacent to the lower end of said posts for tracking on said rails, each of said load rollers being disposed closely adjacent to one of said landing gear wheels, and a latching member, means rotatably mounting said latching members upon said landing gear intermediate said landing gear wheels and said load bearing rollers, said latching member being configurated to form a lip portion for engaging the under surface of the rail flange.

References Cited in the file of this patent

UNITED STATES PATENTS

| | | |
|---|---|---|
| 917,540 | Carr | Apr. 6, 1909 |
| 1,289,653 | Castano | Dec. 31, 1918 |
| 1,541,457 | Winn | June 9, 1925 |
| 1,804,542 | Perin | May 12, 1931 |
| 1,911,771 | Reid | May 30, 1933 |
| 2,043,703 | Main | June 9, 1936 |
| 2,144,081 | Porte | Jan. 17, 1939 |
| 2,355,573 | Talboys | Aug. 8, 1944 |
| 2,458,312 | Stephan | Jan. 4 1949 |
| 2,523,152 | Seyferth | Sept. 19, 1950 |
| 2,760,440 | Kershan | Aug. 28, 1956 |
| 2,781,002 | Talboys | Feb. 12, 1957 |
| 2,839,012 | Gutridge | June 17, 1958 |
| 2,864,321 | Clejan | Dec. 16, 1958 |
| 2,991,731 | Clejan | July 11, 1961 |

FOREIGN PATENTS

| | | |
|---|---|---|
| 388,168 | Great Britain | Feb. 23, 1933 |
| 688,088 | Great Britain | Feb. 25, 1953 |

OTHER REFERENCES

Publication: Railway Age, Dec. 5, 1955, page 61.
Publication: Railway Age, Mar. 7, 1955, pages 46–47.

UNITED STATES PATENT OFFICE
CERTIFICATE OF CORRECTION

Patent No. 3,046,910                      July 31, 1962

James J. Black

It is hereby certified that error appears in the above numbered patent requiring correction and that the said Letters Patent should read as corrected below.

Column 7, line 70, for "and" read -- said --; column 8, line 37, after "it" insert -- to --.

Signed and sealed this 15th day of January 1963.

(SEAL)
Attest:

ERNEST W. SWIDER
Attesting Officer

DAVID L. LADD
Commissioner of Patents